United States Patent
Hashimoto

(10) Patent No.: US 9,196,290 B2
(45) Date of Patent: Nov. 24, 2015

(54) LIBRARY DEVICE

(71) Applicant: FUJITSU LIMITED, Kawasaki-shi, Kanagawa (JP)

(72) Inventor: Koujiro Hashimoto, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 130 days.

(21) Appl. No.: 14/048,919

(22) Filed: Oct. 8, 2013

(65) Prior Publication Data
US 2014/0193226 A1 Jul. 10, 2014

(30) Foreign Application Priority Data
Jan. 9, 2013 (JP) ................................. 2013-002135

(51) Int. Cl.
G11B 17/22 (2006.01)
G11B 15/68 (2006.01)

(52) U.S. Cl.
CPC .......... *G11B 15/6835* (2013.01); *G11B 17/225* (2013.01)

(58) Field of Classification Search
CPC .......................... G11B 17/225; G11B 17/6835
See application file for complete search history.

(56) References Cited

U.S. PATENT DOCUMENTS

| | | | | |
|---|---|---|---|---|
| 5,128,912 A | * | 7/1992 | Hug et al. | 369/30.61 |
| 6,574,063 B1 | * | 6/2003 | Sasaki et al. | 360/69 |
| 6,904,005 B2 | * | 6/2005 | Emberty et al. | 369/30.31 |
| 6,968,257 B2 | * | 11/2005 | Ngo | 700/214 |
| 8,295,005 B2 | * | 10/2012 | Compton et al. | 360/92.1 |
| 8,782,677 B2 | * | 7/2014 | Yoshida et al. | 720/615 |
| 2003/0063966 A1 | * | 4/2003 | Apple et al. | 414/273 |
| 2008/0089190 A1 | * | 4/2008 | Green et al. | 369/30.38 |
| 2015/0071744 A1 | * | 3/2015 | Miyaguchi et al. | 414/277 |

FOREIGN PATENT DOCUMENTS

| | | |
|---|---|---|
| JP | 63-187456 | 8/1988 |
| JP | 1-319164 | 12/1989 |
| JP | 5-166272 | 7/1993 |
| JP | 2008-165895 | 7/2008 |

* cited by examiner

*Primary Examiner* — Kaitlin Joerger
(74) *Attorney, Agent, or Firm* — Staas & Halsey LLP

(57) ABSTRACT

A library device includes: a first robot configured to transport a storage medium stored in a storage rack; and a second robot configured to transport a storage medium stored in the storage rack; and wherein the first robot and the second robot each include: a hand device; a transportation body including a slot to store the storage medium; a rotation device configured to rotate the transportation body between a first orientation in which an opening of the slot faces the hand device of at least one of the first robot and the second robot and a second orientation in which the opening of the slot faces the hand device of the other one of the first robot and the second robot; and a switch device configured to control the rotation device.

16 Claims, 20 Drawing Sheets

EVACUATION CABINET

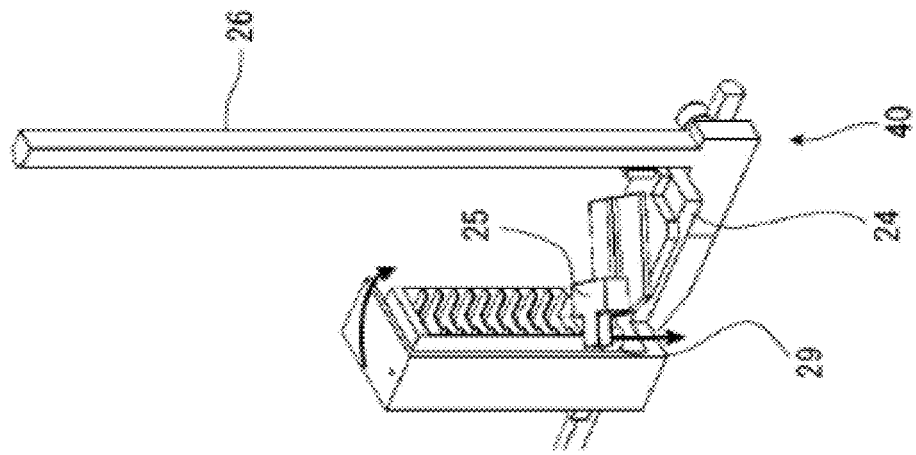
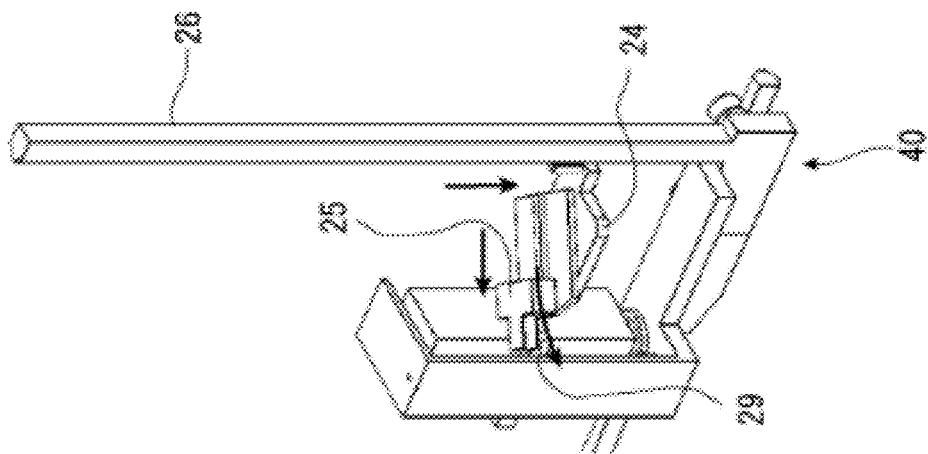
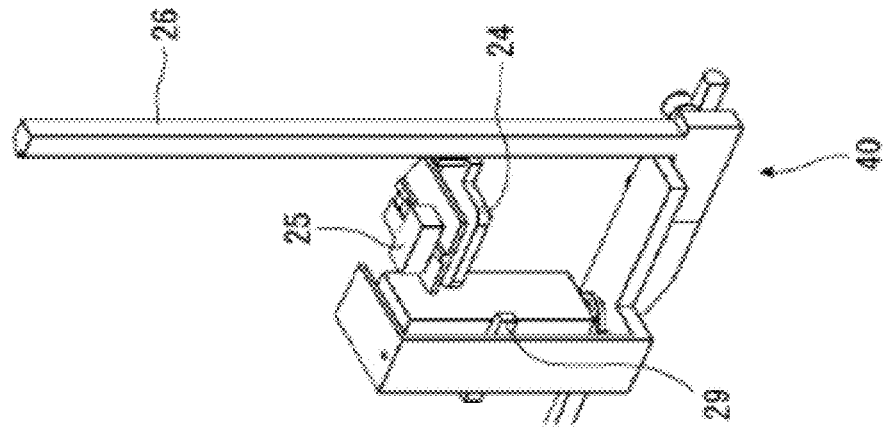

LIBRARY DEVICE

CROSS-REFERENCE TO RELATED APPLICATION

This application is based upon and claims the benefit of priority of the prior Japanese Patent Application No. 2013-002135, filed on Jan. 9, 2013, the entire contents of which are incorporated herein by reference.

FIELD

Embodiments discussed herein are related to library devices.

BACKGROUND

With an increase in the amount of data handled by an electronic device, a library device that is provided with a storage rack in which a plurality of slots are provided and stores a large number of storage media such as magnetic tape cartridges, disk cartridges, and so forth is used. Such a library device includes one or a plurality of tape drives that read data from and write data into the storage media and a robot that moves the storage medium between the slot and the tape drive. The robot also moves the storage medium between a charge and discharge section, such as a mailslot, for a storage medium and the slot. The library device is used by being coupled to a plurality of servers. In such a library device, when job instructions are issued from the plurality of servers, the robot transports a large number of storage media. When the number of storage media to be transported is increased, the operating time of the robot is prolonged, and it may take time to complete the job.

Related art is disclosed in Japanese Laid-open Patent Publication No. 63-187456 or Japanese Laid-open Patent Publication No. 1-319164.

SUMMARY

According to one aspect of the embodiments, a library device includes: a first robot configured to transport a storage medium stored in a storage rack; and a second robot configured to transport a storage medium stored in the storage rack; and wherein the first robot and the second robot each include: a hand device; a transportation body including a slot to store the storage medium; a rotation device configured to rotate the transportation body between a first orientation in which an opening of the slot faces the hand device of at least one of the first robot and the second robot and a second orientation in which the opening of the slot faces the hand device of the other one of the first robot and the second robot; and a switch device configured to control the rotation device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 20A to 20C depict an example of a return to original orientation of a transportation body.

DESCRIPTION OF EMBODIMENTS

Figure 1:
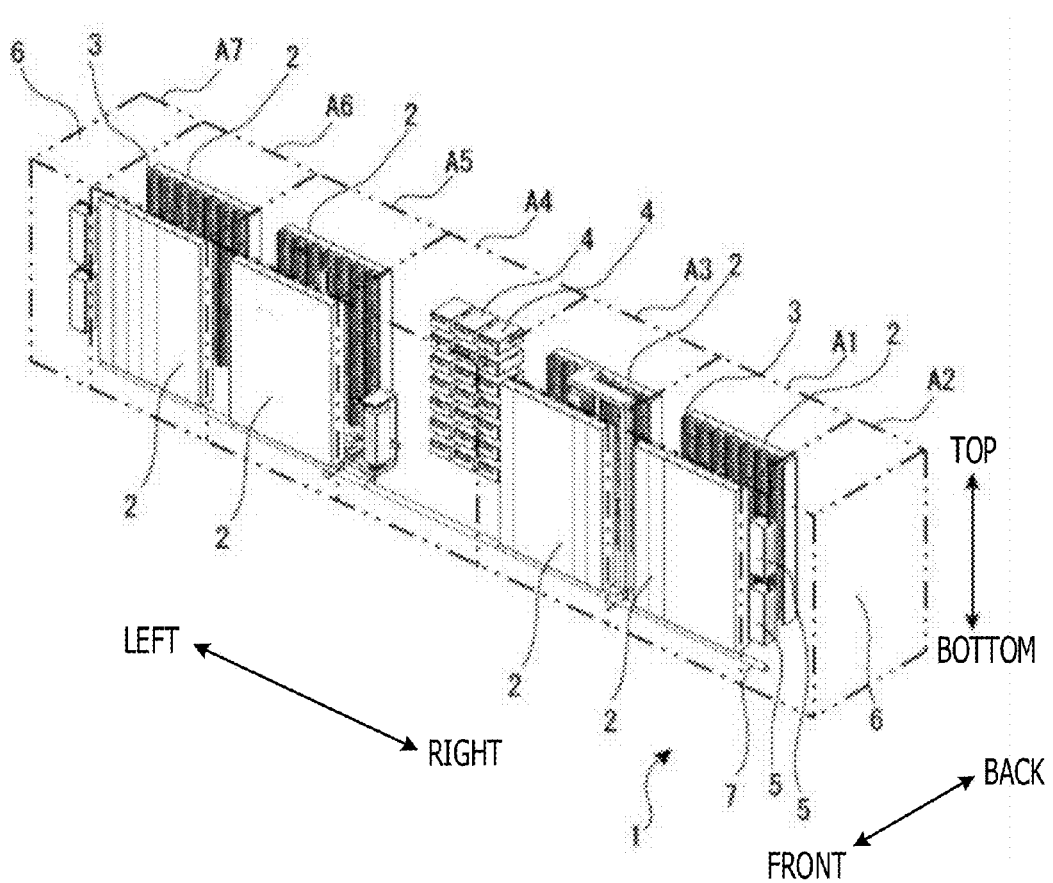
FIG. 1 depicts an example of a library device.

For example, a transport mechanism of a large-capacity disk storage stores two cartridges (storage media), takes out a cartridge, and inserts a cartridge. The large-capacity disk storage first takes a replacement cartridge into one storing section of the transport mechanism. After moving the transport mechanism to a position in which the cartridge to be replaced is located, the large-capacity disk storage takes the cartridge to be replaced into another storing section of the transport mechanism and empties that portion. The large-capacity disk storage inserts the cartridge taken into the one storing section of the transport mechanism into the emptied place, and ends the replacement of the cartridge.

The above-described large-capacity disk storage shortens the time of replacement of the storage medium in one slot (storing section).

In the drawings, the dimensions, ratio, and so forth of each section may be different from the actual dimensions, ratio, and so forth of the section.

Figure 2:
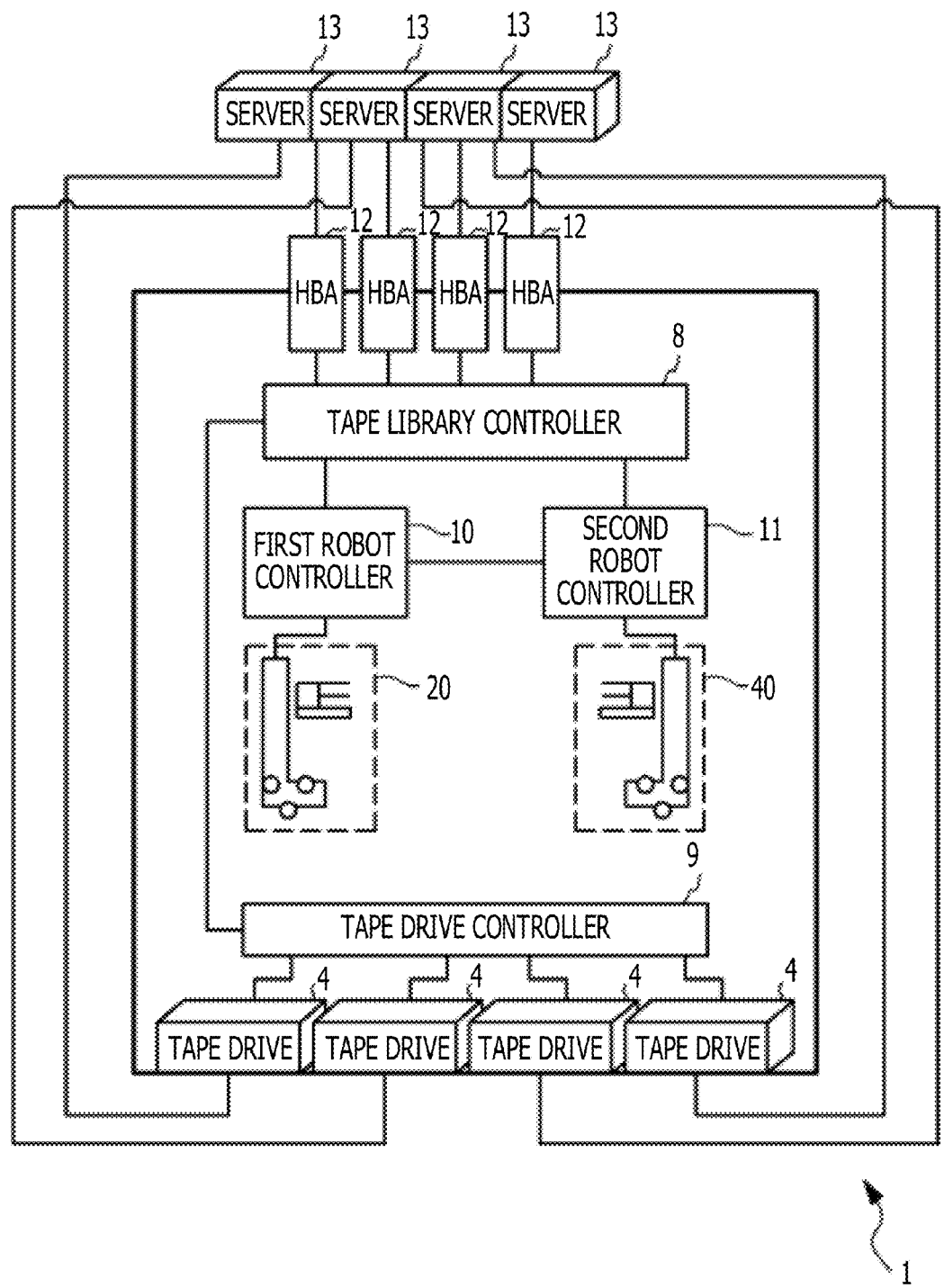
FIG. 2 depicts an example of a block diagram of the library device.

FIG. 1 depicts an example of a library device. FIG. 2 depicts an example of a block diagram of a library device. A storage medium 14 of a library device 1 depicted in FIGS. 1 and 2 may be, for example, a magnetic tape cartridge and may be other storage media such as a magnetic disk cartridge. In the following description, a horizontal direction, a front-back direction, and a vertical direction may be directions depicted in FIG. 1.

In the library device 1, a plurality of cabinets A1 to A7 containing storage racks 2 or tape drives 4 are coupled to one another. Of these cabinets A1 to A7, in the cabinets A2, A3, A5, and A6, the storage racks 2 are housed. The storage racks 2 are disposed in the cabinets A2, A3, A5, and A6 in such a way that openings of slots 3 face each other. Of the seven cabinets, in the cabinet A4 located in the center, a plurality of tape drives 4 are housed. As described above, separating the cabinet housing the storage racks 2 from the cabinet housing the tape drives 4 may facilitate connection between the tape drives 4 and facilitate power supply. Forming a cable or the like that is coupled to the tape drives 4 may be performed efficiently. Of the cabinets A2, A3, A5, and A6 housing the storage racks 2, in the cabinet A2 and the cabinet A6 that are located at the ends, a charge and discharge section 5 for the storage medium 14 is provided. The charge and discharge section 5 is detachable and charges or discharges a large number of storage media at one time. The cabinet A1 and the cabinet A7 which form evacuation sections 6 are coupled to the outside of the cabinet A2 and the cabinet A6 which are located at the ends. The number of cabinets may be changed in accordance with the size of the library device 1 such as the number of storage racks 2 and the number of tape drives 4.

The library device 1 includes a first robot 20 and a second robot 40 that transport the storage media 14 stored in the storage racks 2. The first robot 20 and the second robot 40 may be disposed on the same orbit, for example, a rail 7.

With reference to FIG. 2, the library device 1 includes a tape library controller 8. Servers 13 are coupled to the tape library controller 8 via host bus adapters (HBAs) 12. A first robot controller 10 that controls the first robot 20 and a second robot controller 11 that controls the second robot 40 are coupled to the tape library controller 8. The tape drives 4 are coupled to the tape library controller 8 via a tape drive controller 9.

Figure 3:
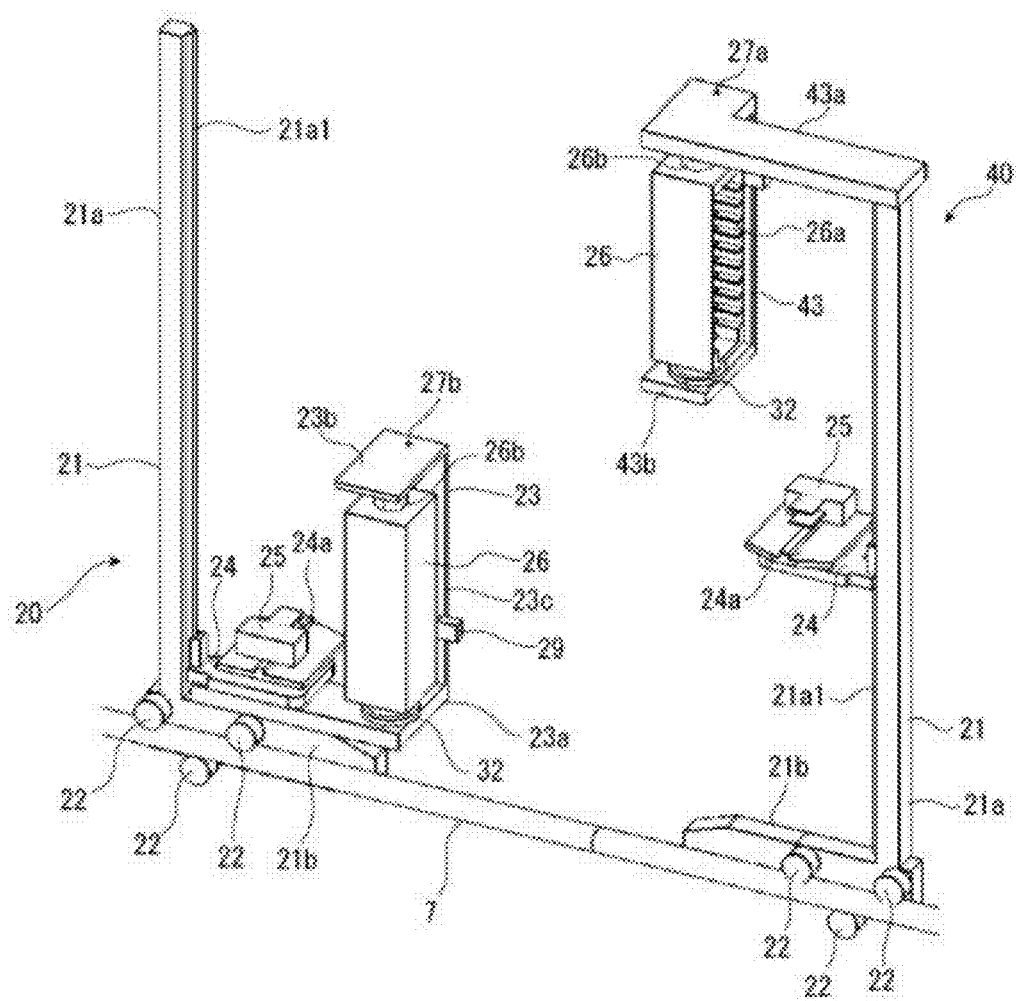
FIG. 3 depicts an example of a robot.
Figure 4:
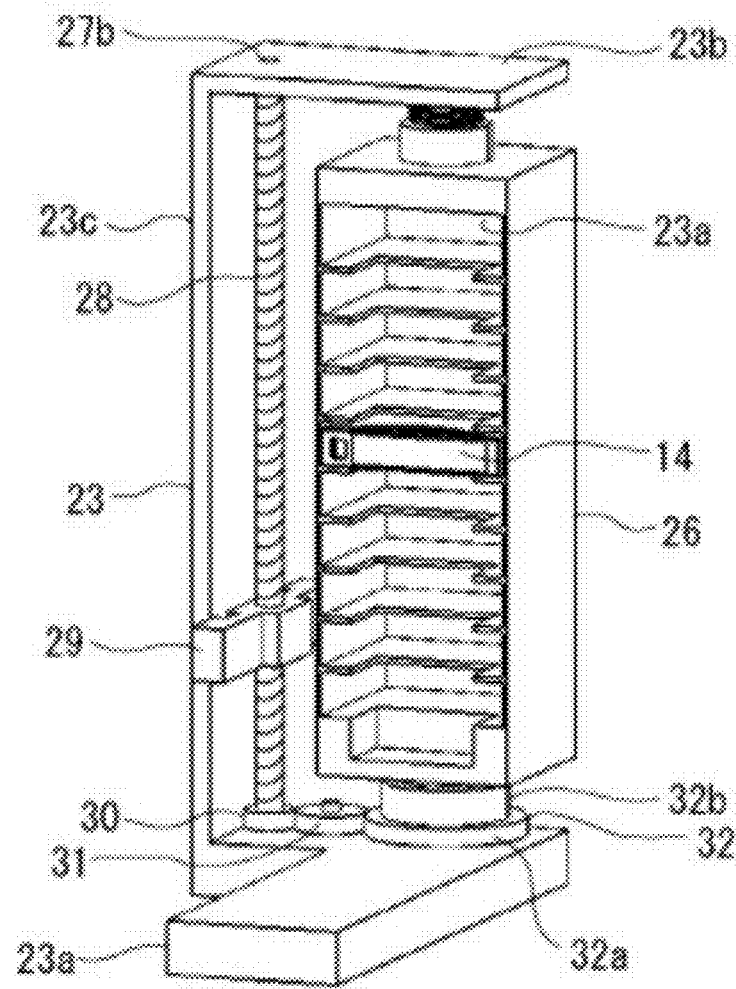
FIG. 4 depicts an example of a component element around a transportation body of the robot.

FIG. 3 depicts an example of a robot. FIG. 4 depicts an example of a component element around a transportation body of a robot. The robot includes the first robot 20 and the second robot 40. The structure of the first robot 20 may be substantially identical to the structure of the second robot 40 or may be similar to the structure of the second robot 40. Therefore, the first robot 20 may be mainly described or reduced, and, as for the second robot 40, a difference from the first robot 20 may be described.

In FIGS. 3 and 4, the first robot 20 is provided with a frame section 21. The frame section 21 includes a supporting column section 21a extending in a vertical direction and a chassis section 21b that is orthogonal to the supporting column section 21a and extends in a horizontal direction. In the supporting column section 21a, a rail section 21a1 along which an elevating base section 24 slides in a longitudinal direction is provided. Traveling rollers 22 that make the first robot 20 run on the rail 7 are attached to the chassis section 21b. The chassis section 21b runs along the rail 7 by a gear driven by a motor controlled by the first robot controller 10. In the chassis section 21b, a fixing base section 23 is provided. The fixing base section 23 is provided with a lower fixing plate 23a extending in a horizontal direction, for example, along the rail 7. The fixing base section 23 is provided with an upper fixing plate 23b. The lower fixing plate 23a and the upper fixing plate 23b are in a state in which the lower fixing plate 23a and the upper fixing plate 23b are coupled to each other by a continuous connection plate 23c. The continuous connection plate 23c is located at the back in FIG. 3. Therefore, the side on which the first robot 20 faces the second robot 40 is in an open state.

The elevating base section 24 is attached to the supporting column section 21a in such a way as to be able to move up and down in a vertical direction along the rail section 21a1. A hand device 25 is mounted on the elevating base section 24. The up-and-down movement of the elevating base section 24, the rotation of the hand device 25 and the operation performed by the hand device 25 to grasp the storage medium 14 are controlled by the first robot controller 10. As the elevating base section 24 and the hand device 25, known techniques may be used.

Figure 5:
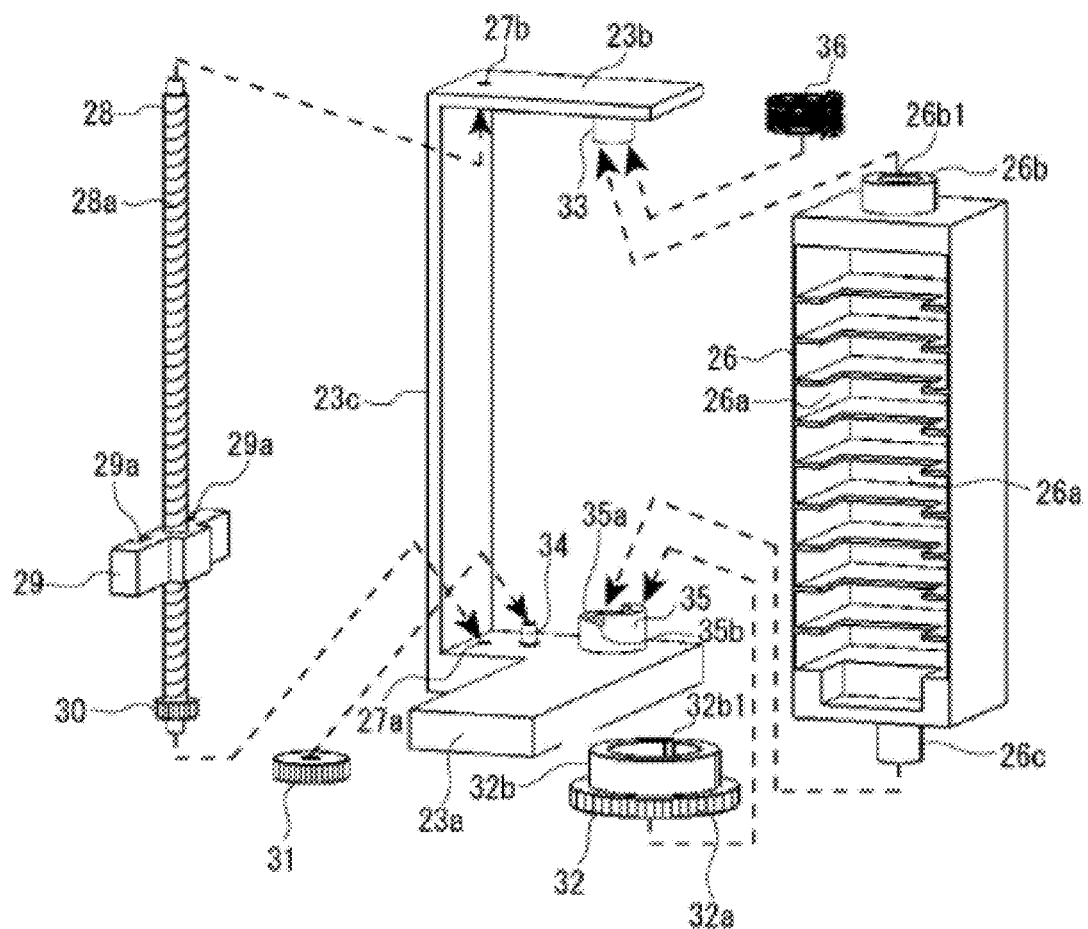
FIG. 5 depicts an example of an exploded view of a component element around a transportation body of a robot.

The first robot 20 has, on the fixing base section 23, a transportation body 26 in which slots 26a temporarily storing the storage media 14 are provided. For example, the transportation body 26 prepares a slot for a buffer. The transportation body 26 is provided in a position next to the supporting column section 21a with the elevating base section 24 placed therebetween. The transportation body 26 may be shaped like a box and has a plurality of slots 26a. Therefore, the transportation body 26 temporarily stores many storage media 14 in the slots 26a. Thus, many storage media 14 are collected or distributed at one time, whereby the time for transporting a large number of the storage media 14 may be shortened. The transportation body 26 rotates on the fixing base section 23. FIG. 5 depicts an example of an exploded view of a component element around a transportation body of a robot. In FIG. 5, the transportation body 26 has a base section 26b at an upper end thereof. The base section 26b is provided with a hollow portion 26b1 that becomes a bearing for rotating the transportation body 26. The transportation body 26 has an axis section 26c at a lower end thereof. In the axis section 26c, an engaging pin 26c1 protruding in a radial direction is provided.

Figure 6:
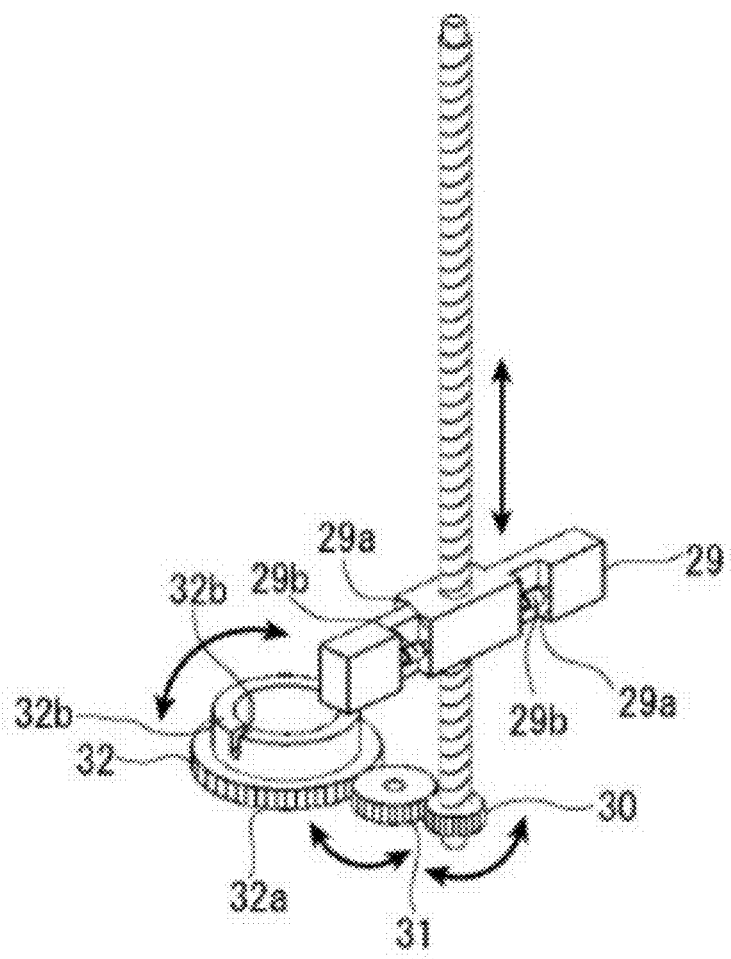
FIG. 6 depicts an example of a rotation device of a robot.

In FIG. 5, a rotation device 37 that rotates the transportation body 26 is provided on the fixing base section 23. FIG. 6 depicts an example of a rotation device of the robot. In FIG. 6, the rotation device 37 includes a rotating shaft 28, a lever member 29, a first gear 30, a second gear 31, and a third gear 32. The ends of the rotating shaft 28 are inserted into a support hole 27a provided in the lower fixing plate 23a and a support hole 27b provided in the upper fixing plate 23b, whereby the rotating shaft 28 is rotatably installed in a standing manner and supported on the fixing base section 23. A screw section 28a is provided on the surface of the rotating shaft 28. The rotation device 37 is provided with the lever member 29 that rotates the rotating shaft 28 by being screwed on the screw section 28a and performing up-and-down movement in an axial direction of the rotating shaft 28. The rotation of the rotating shaft 28 generated as a result of the lever member 29 moving up and down is transferred to the transportation body 26 by a rotation transferring section including the first gear 30, the second gear 31, and the third gear 32. The first gear 30 is attached to a lower end of the rotating shaft 28. The second gear 31 that engages the first gear 30 is attached to an axis section 34 provided in the lower fixing plate 23a. The third gear 32 that engages the second gear 31 is attached to a support section 35 provided in the lower fixing plate 23a. The third gear 32 includes a gear section 32a and a cylindrical section 32b. In the cylindrical section 32b, a slit 32b1 is provided.

Figure 7A:
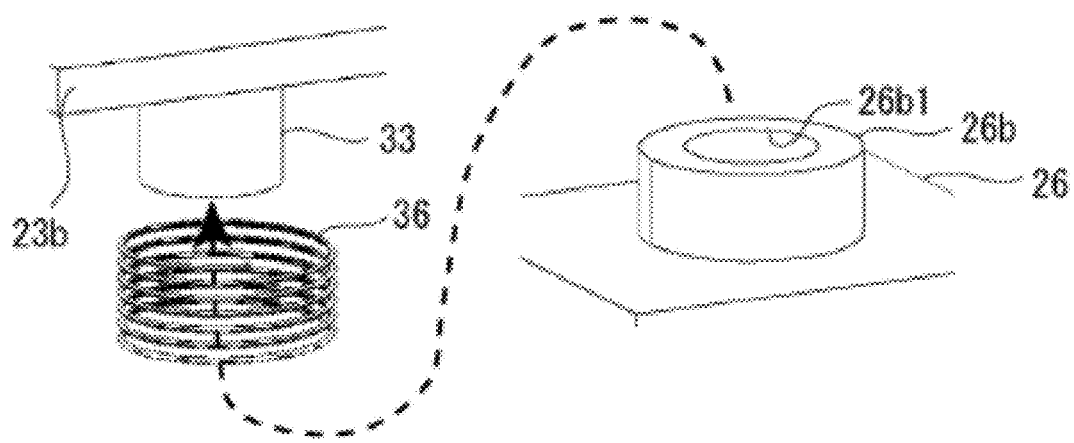
FIGS. 7A and 7B depict an example of a supporting portion in an upper part of a transportation body.
Figure 7B:
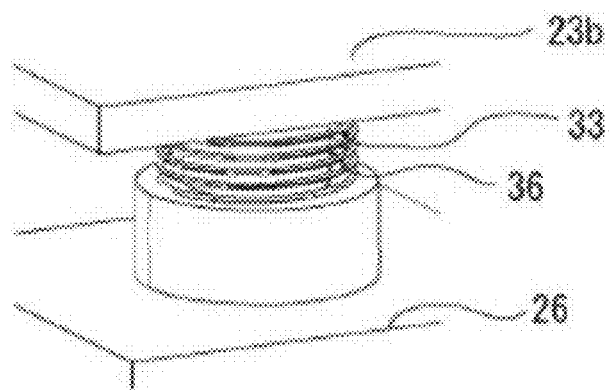
Figure 8A:
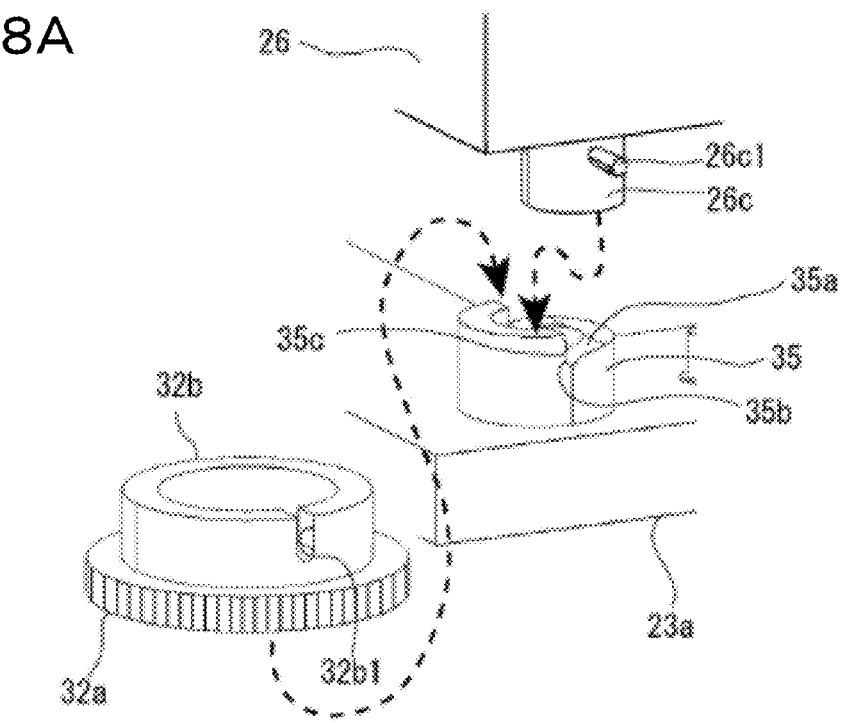
FIGS. 8A and 8B depict an example of a supporting portion in a lower part of a transportation body.
Figure 8B:
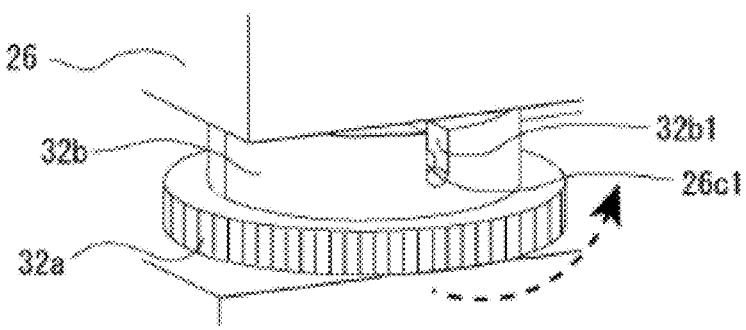
Figure 9A:
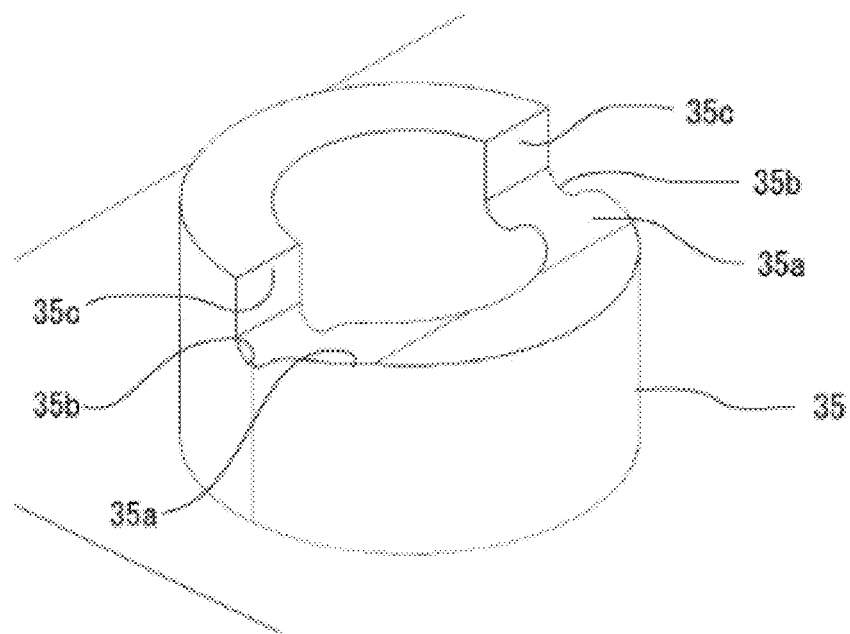
FIG. 9A depicts an example of a perspective view of a support section of a transportation body.
Figure 9B:
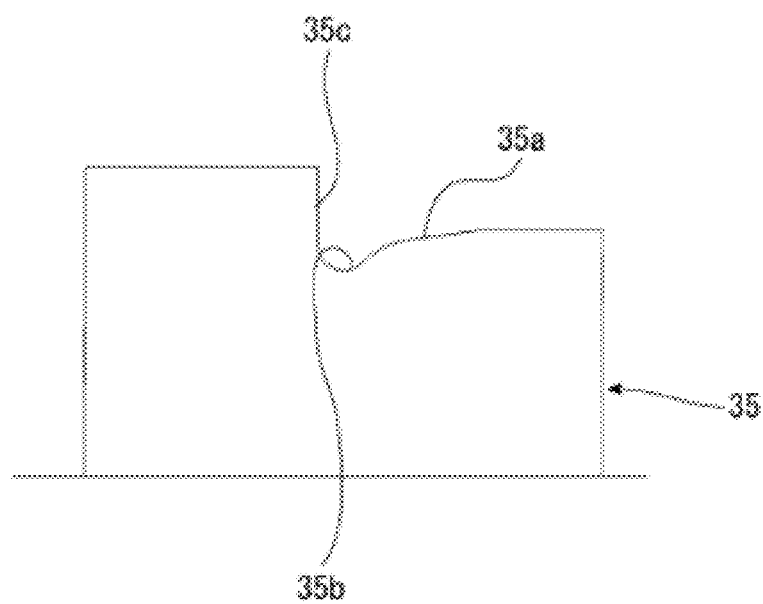
FIG. 9B depicts an example of a side view of the support section of a transportation body.
Figure 10A:
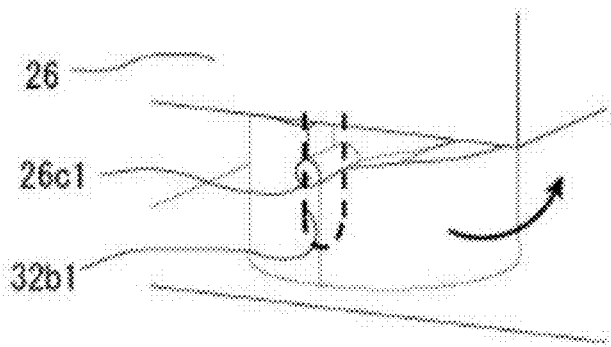
FIGS. 10A to 10C depict an example of rotation of a transportation body.
Figure 10B:
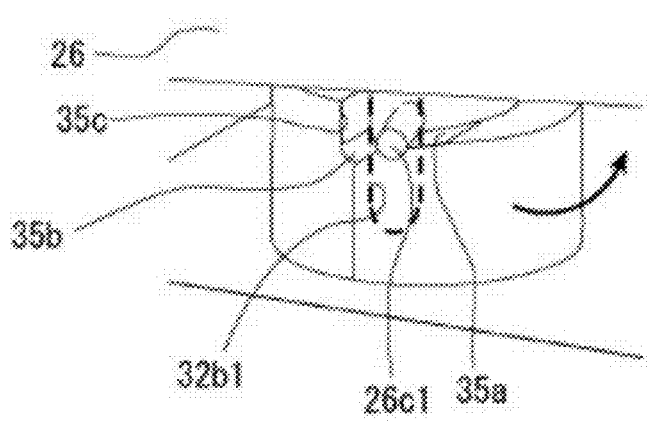
Figure 10C:
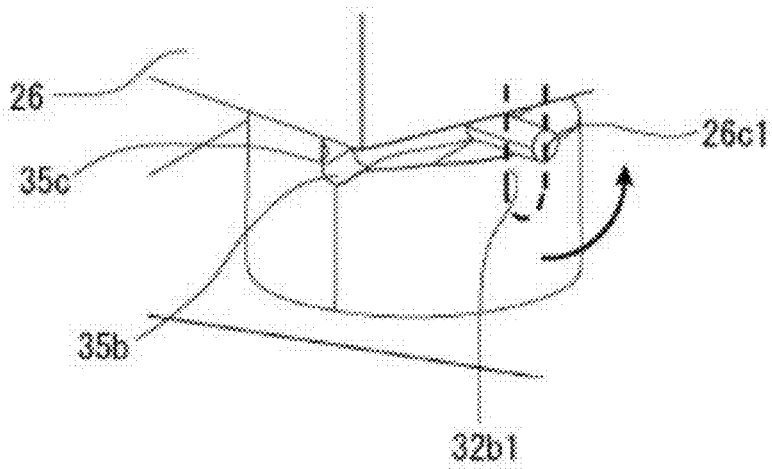

FIGS. 7A and 7B depict an example of a supporting portion in an upper part of a transportation body. In FIGS. 7A and 7B, a supporting convex portion 33 provided in the upper fixing plate 23b is inserted into the hollow portion 26b1 of the base section 26b. At this time, between the upper fixing plate 23b and the base section 26b, a coil-shaped spring 36 is interposed. The spring 36 urges the transportation body 26 downward. FIGS. 8A and 8B depict an example of a supporting portion in a lower part of a transportation body. In FIGS. 8A and 8B, the axis section 26c is inserted in the support section 35. The third gear 32 is attached to the support section 35 and the engaging pin 26c1 provided in the axis section 26c engages the slit 32b1 provided in the cylindrical section 32b of the third gear 32. Therefore, the transportation body 26 rotates as a result of the third gear 32 rotating. FIG. 9A depicts an example of a perspective view of a support section of a transportation body. FIG. 9B depicts an example of a side view of a support section of a transportation body. In FIGS. 9A and 9B, the support section 35 may have a cam-like shape. For example, the support section 35 may have a cylindrical shape and has two inclined surfaces 35a on an upper surface side. At an end of each inclined surface 35a, a groove-like lock section 35b is provided. From the lock sections 35b in two places, wall sections 35c extend vertically. FIGS. 10A to 10C depict an example of rotation of a transportation body. In FIGS. 10A to 10C, the engaging pin 26c1 moves along the inclined surface 35a by engaging the slit 32b1 and being pushed downward by an urging force of the spring 36. The wall sections 35c in two places are provided in positions 180 degrees away from each other on the circumference of a circle of the support section 35. The wall sections 35c define the rotation range of the transportation body 26. Therefore, the transportation body 26 rotates 180 degrees. For example, the transportation body 26 is allowed to rotate at least between an orientation in which the openings of the slots 26a face the hand device 25 of the first robot 20 and an orientation in which the openings of the slots 26a face the hand device 25 of the second robot 40. For example, the transportation body 26 is switched between a state in which the openings of the slots 26a are located on the right-hand side and a state in which the openings of the slots 26a face to the left. Since the engaging pin 26c1 is located in the lock section 35b at each end of the movement range, backlash of the transportation body 26 may be reduced.

A guide roller 29b is incorporated into the lever member 29. The guide roller 29b is in contact with the continuous connection plate 23c coupling the lower fixing plate 23a and the upper fixing plate 23b. Therefore, the rotation of the lever member 29 itself may be reduced and smooth up-and-down movement may be performed. Since the rotation of the lever member 29 itself is reduced, the rotating shaft 28 rotates by the up-and-down movement of the lever member 29.

As a result of the lever member 29 moving up and down, the rotation of the transportation body 26 is generated. As a switch device for activating the rotation device 37, the hand device 25 that moves up and down may be adopted. For example, the switch device of the rotation device 37 of the first robot 20 may be the hand device 25 of the second robot 40. The switch device of the rotation device 37 of the second robot 40 may be the hand device 25 of the first robot 20. Since the hand device 25 is provided in such a way as to be movable up and down, the hand device 25 moves the lever member 29 up and down by up-and-down movement. As a result of a grasping section of the hand device 25 being contact with the lever member 29, the lever member 29 moves up and down. Since the hand device 25 itself rotates, the hand device 25 may act on the lever member 29 of the other robot. The lever member 29 may have a shape that allows the hand device 25 of the other robot to get to the lever member 29. The hand device 25 of the robot in which the lever member 29 is provided may get to the lever member 29. For example, the lever member 29 may have a shape projecting in a horizontal direction with respect to the continuous connection plate 23c.

Figure 11A:
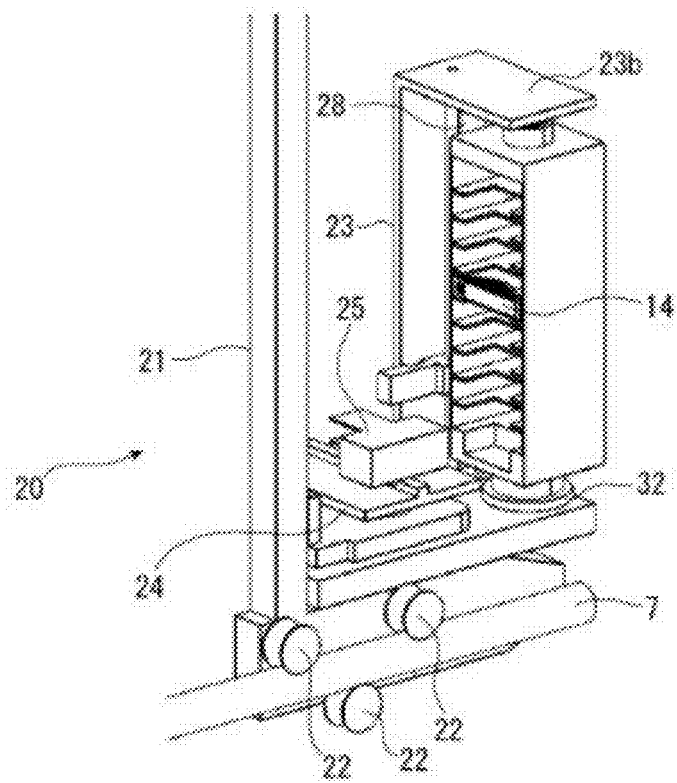
FIGS. 11A and 11B depict an example of grasping a storage medium by a hand device.
Figure 11B:
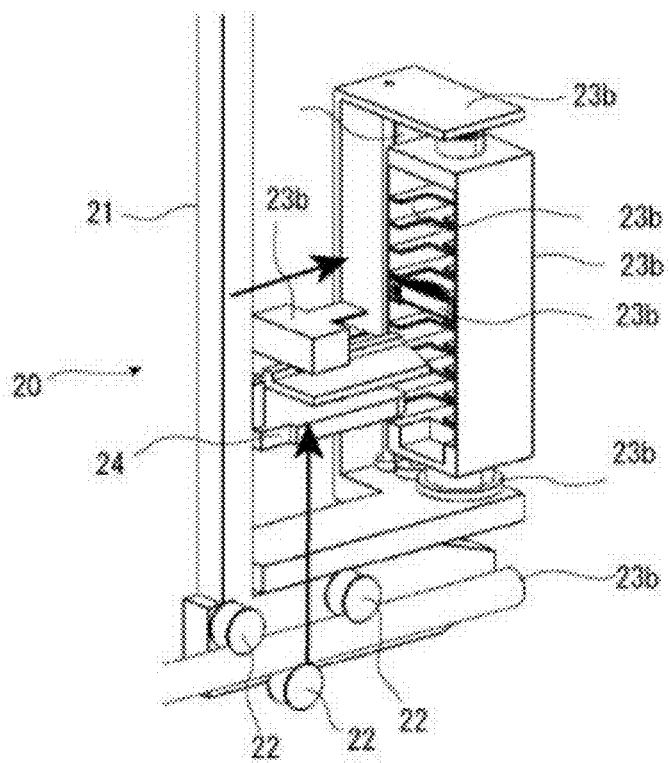
Figure 12A:
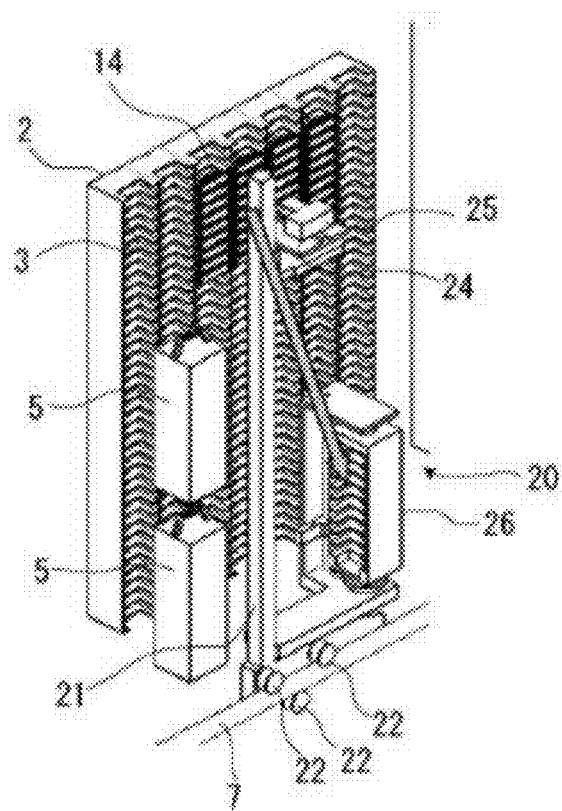
FIGS. 12A and 12B depict an example of a movement of a storage medium to a transportation body.
Figure 12B:
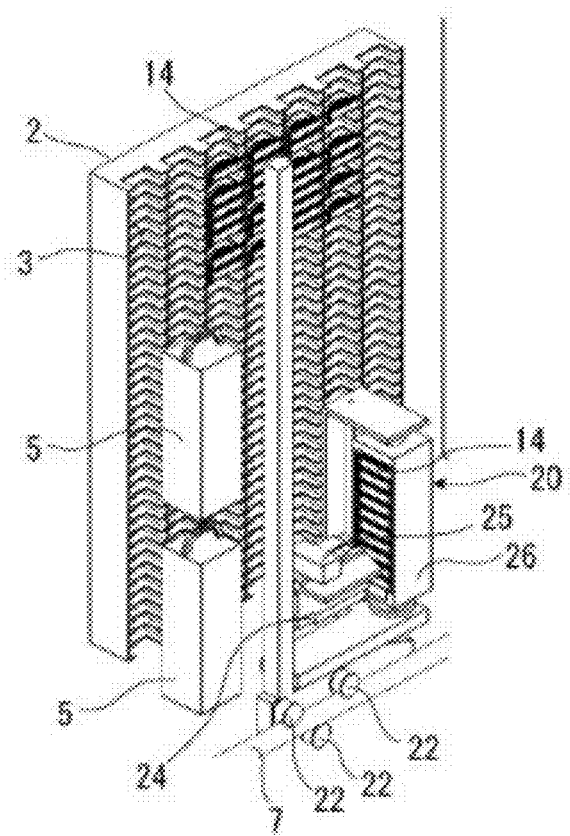
Figure 13:
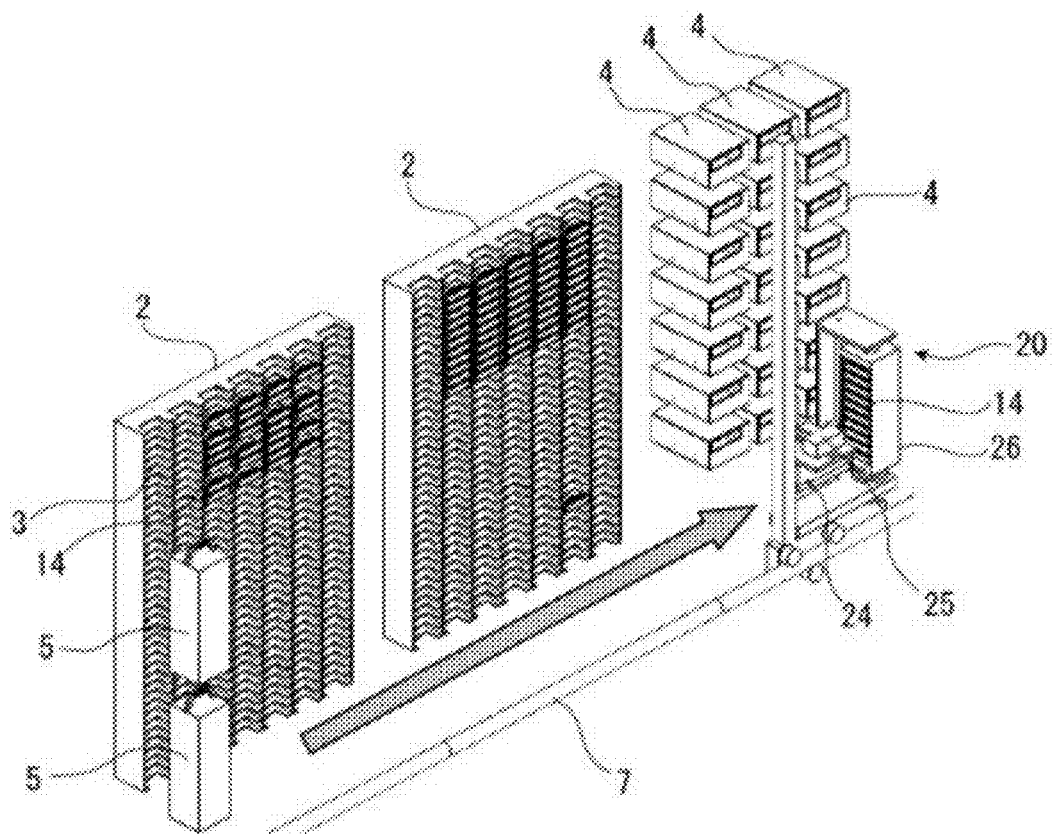
FIG. 13 depicts an example of transportation of storage media.
Figure 14:
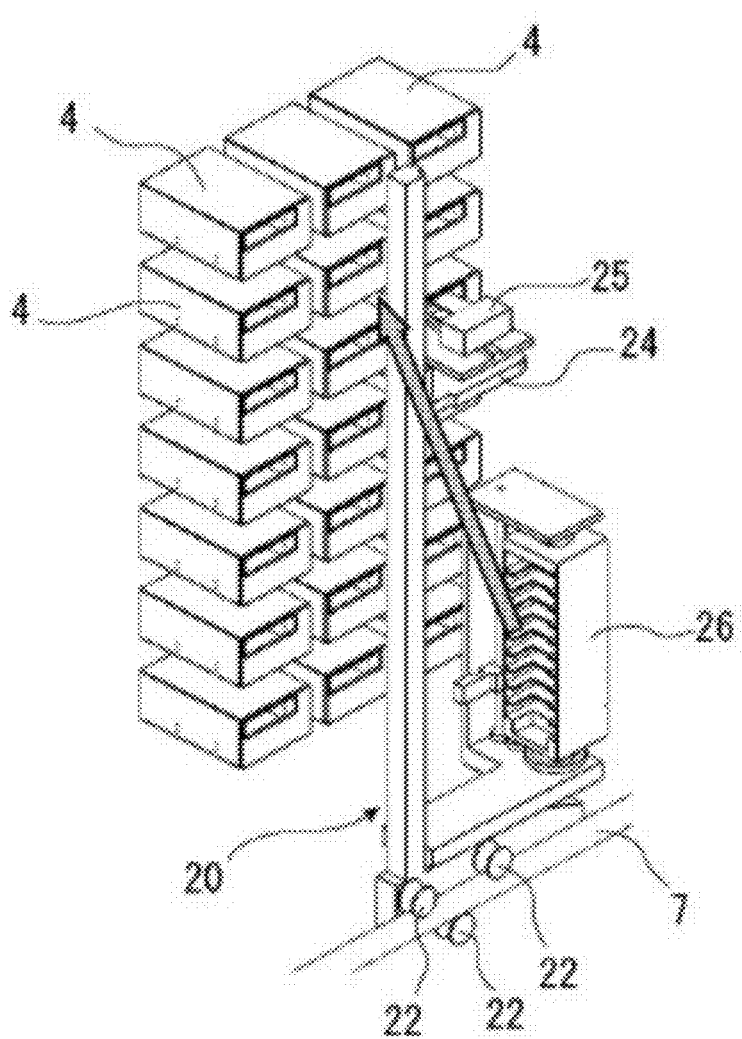
FIG. 14 depicts an example of transportation of storage media.

The first robot 20 moves the storage medium 14 between the storage rack 2, the tape drive 4, and the charge and discharge section 5 in accordance with an instruction. For example, the storage medium 14 stored in the storage rack 2 may move to the tape drive 4. At the time of normal operation, for example, when the first robot 20 is not broken down, the openings of the slots 26a of the transportation body 26 of the first robot 20 face the hand device 25 of the first robot 20. FIGS. 11A and 11B depict an example of grasping a storage medium by a hand device. In FIG. 11A, the hand device 25 of the first robot 20 takes out the storage medium 14 stored in the storage rack 2 and, as depicted in FIG. 11B, moves the storage medium 14 to the slot 26a of the transportation body 26. FIGS. 12A and 12B depict an example of a movement of a storage medium to a transportation body. As depicted in FIGS. 12A and 12B, the first robot 20 moves to a position in which another storage medium 14 which is a target storage medium 14 is stored and moves the storage medium 14 to the slot 26a. This operation is repeated in accordance with the job instruction that has been issued at that time, and a large number of storage media 14 are taken into the transportation body 26. FIGS. 13 and 14 depict an example of transportation of storage media. As depicted in FIG. 13, the first robot 20 moves to the front of the tape drive 4 and inserts the storage medium 14 into the tape drive 4 by the hand device 25 as depicted in FIG. 14. Since the first robot 20 moves a large number of storage media 14 at one time, the transportation time may be shortened. When the storage media 14 are collected from a plurality of tape drives 4 and put back into intended slots 3, the transportation body 26 is also used, whereby the transportation time may be shortened.

Figure 15:
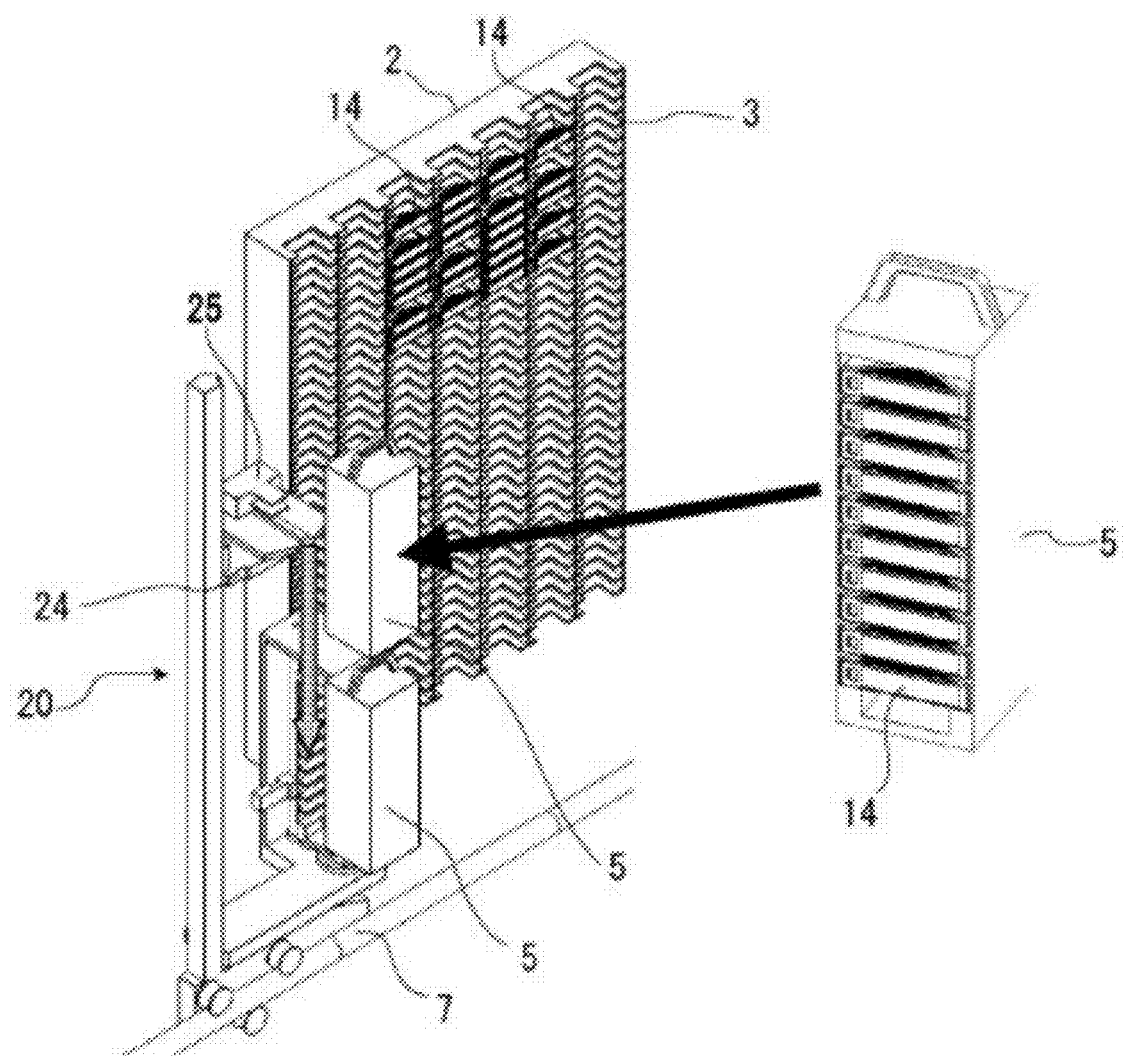
FIG. 15 depicts an example of transportation of storage media.

FIG. 15 depicts an example of transportation of storage media. As depicted in FIG. 15, when a large number of storage media 14 are charged at one time, a large number of storage media 14 are prepared in the charge and discharge section 5 and the storage media 14 are moved from the charge and discharge section 5 to the transportation body 26. Each storage medium 14 is transported to a target slot 3 of the storage rack 2. Since the first robot 20 does not go back to the charging position to pick up the storage medium 14, the transportation time may be shortened. Since the transportation body 26 is used when the storage medium 14 is discharged, the transportation time may be shortened. In any of these movements, when a target storage medium 14 is one storage medium 14, the hand device 25 only has to move to an intended location while grasping the storage medium 14.

In FIG. 3, the main structure of the second robot 40 may be shared by the second robot 40 and the first robot 20. While the transportation body 26 of the first robot 20 is placed in a lower part of the frame section 21, the transportation body 26 of the second robot 40 is placed in an upper part of the frame section. The transportation body 26 of the first robot 20 and the transportation body 26 of the second robot 40 may be disposed in such a way that, for example, the transportation body 26 of the first robot 20 and the transportation body 26 of the second robot 40 are displaced from each other in a direction (vertical direction) orthogonal to the orbit (the rail 7) such that the transportation bodies 26 do not make contact with each other when the first robot 20 and the second robot 40 are made to get closer to each other. As a result of the transportation bodies 26 being placed in such a way as to be vertically displaced from each other, a positional relationship in which the hand device 25 of the first robot 20 is allowed to get to the transportation body 26 of the second robot 40 and the hand device 25 of the second robot 40 is allowed to get to the transportation body 26 of the first robot 20 is established. In the second robot 40, since the transportation body 26 is provided in the upper part of the frame section 21, a fixing base section 43 which is a fixing base section obtained by rotating the fixing base section 23 in the first robot 20 is used. Since the fixing base section 43 corresponds to the rotated fixing base section 23, the lower fixing plate 23a in the fixing base section 23 corresponds to an upper fixing plate 43a and the upper fixing plate 23b corresponds to a lower fixing plate 43b. The other main structure of the second robot 40 may be substantially identical to the structure of the first robot 20 or may be similar to the structure of the first robot 20, and the same component elements are identified with the same reference characters and their explanations may be omitted or reduced.

Since the library device 1 includes the two robots: the first robot 20 and the second robot 40, each having a transportation body, the number of storage media 14 that are allowed to be transported in one operation may be increased. This may improve the efficiency of transporting the storage media 14 and shorten the time for transporting the storage media 14.

In the library device 1 including the two robots, for example, the first robot 20 and the second robot 40, even when one robot has broken down, the job is continuously performed as long as the other robot operates normally. For example, the first robot 20 located on the left side in FIG. 3 may break down.

Figure 16A:
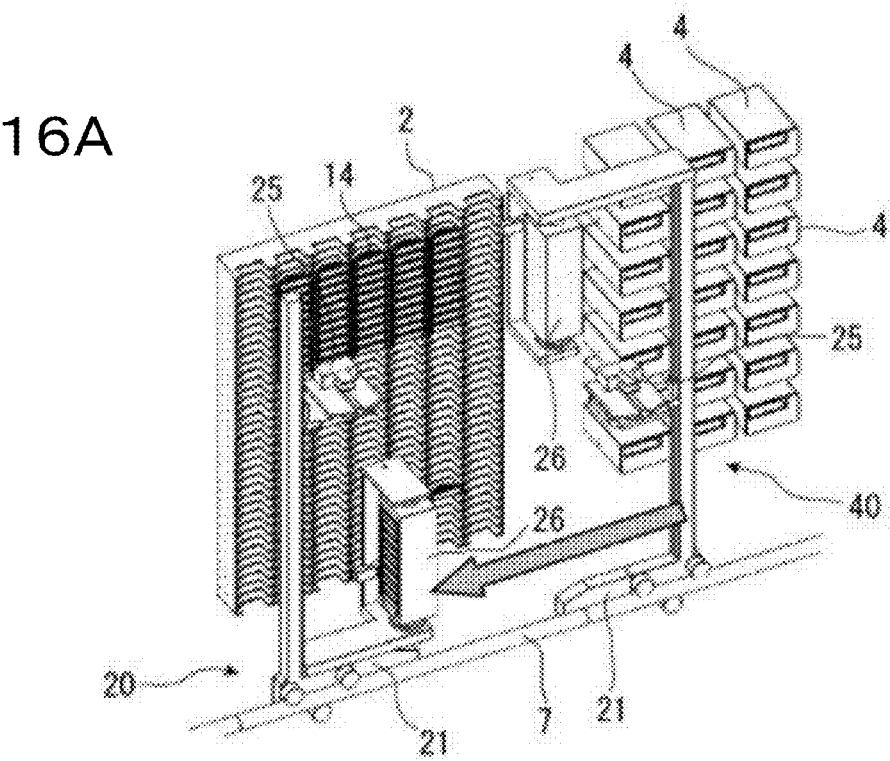
FIGS. 16A and 16B depict an example of evacuation of a robot.
Figure 16B:
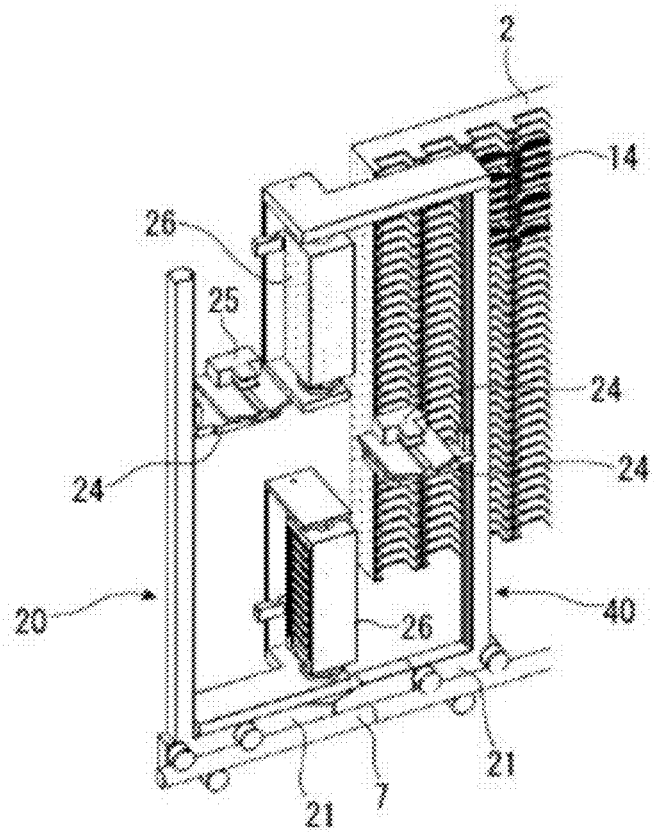

FIGS. 16A and 16B depict an example of evacuation of a robot. As depicted in FIGS. 16A and 16B, the second robot 40 pushes the broken-down first robot 20. As a result, the first robot 20 moves to an evacuation section 6 provided in the cabinet A7 serving as an evacuation cabinet. Since it becomes impossible for the second robot 40 to get to the storage rack 2 if the first robot 20 remains in front of the storage rack 2, the first robot 20 is evacuated. Since the transportation body 26 of the first robot 20 and the transportation body 26 of the second robot 40 do not come into contact with each other, the first robot 20 and the second robot 40 may be allowed to get closer to each other to positions in which the frame sections 21 of the first robot 20 and the second robot 40 come into contact with each other.

Figure 17A:
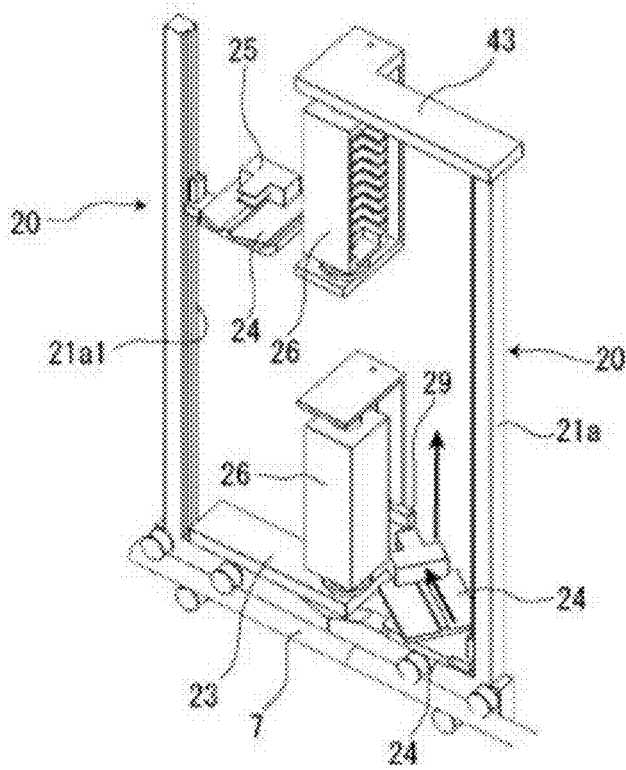
FIGS. 17A and 17B depict an example of rotation of an opening of slot.
Figure 17B:
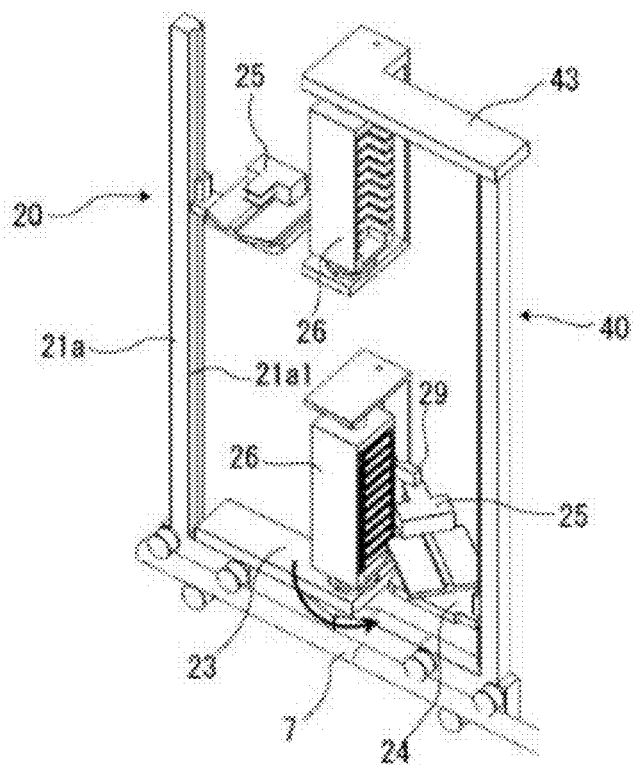
Figure 18:
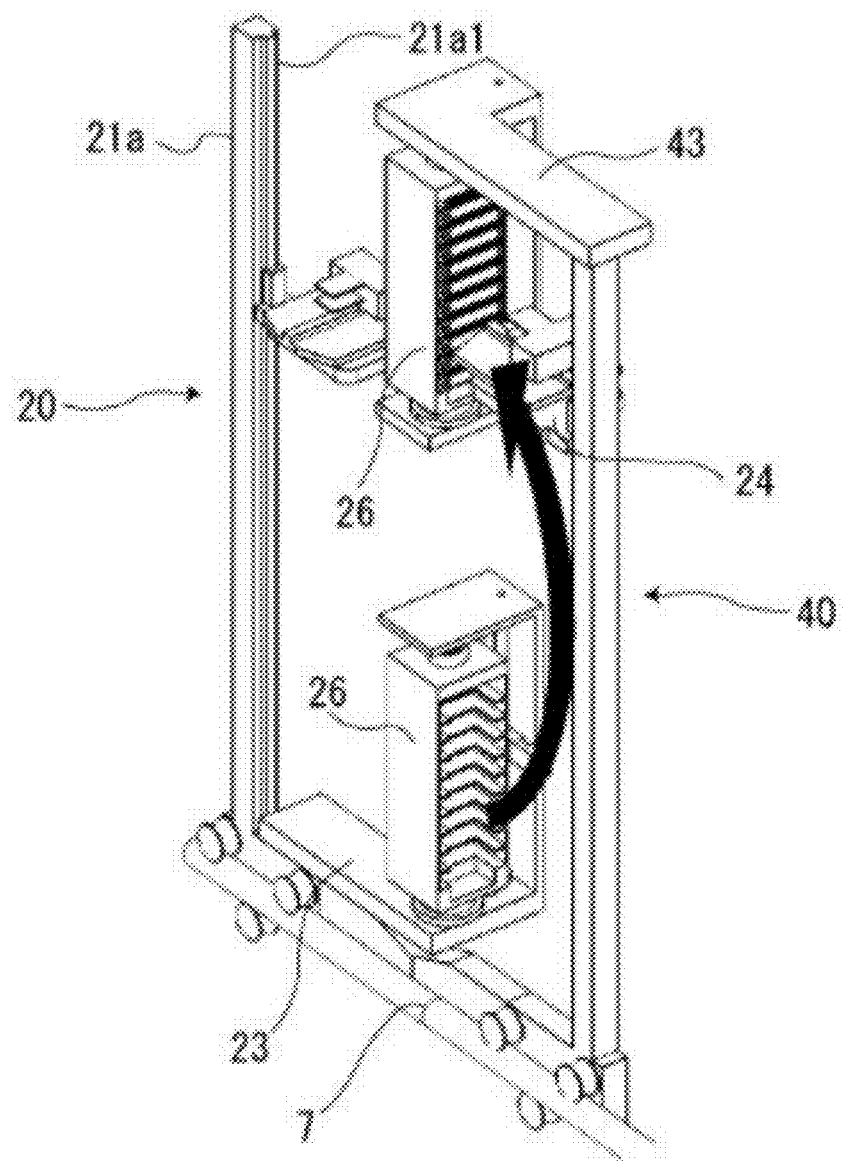
FIG. 18 depicts an example of movement of a storage medium.
Figure 19:
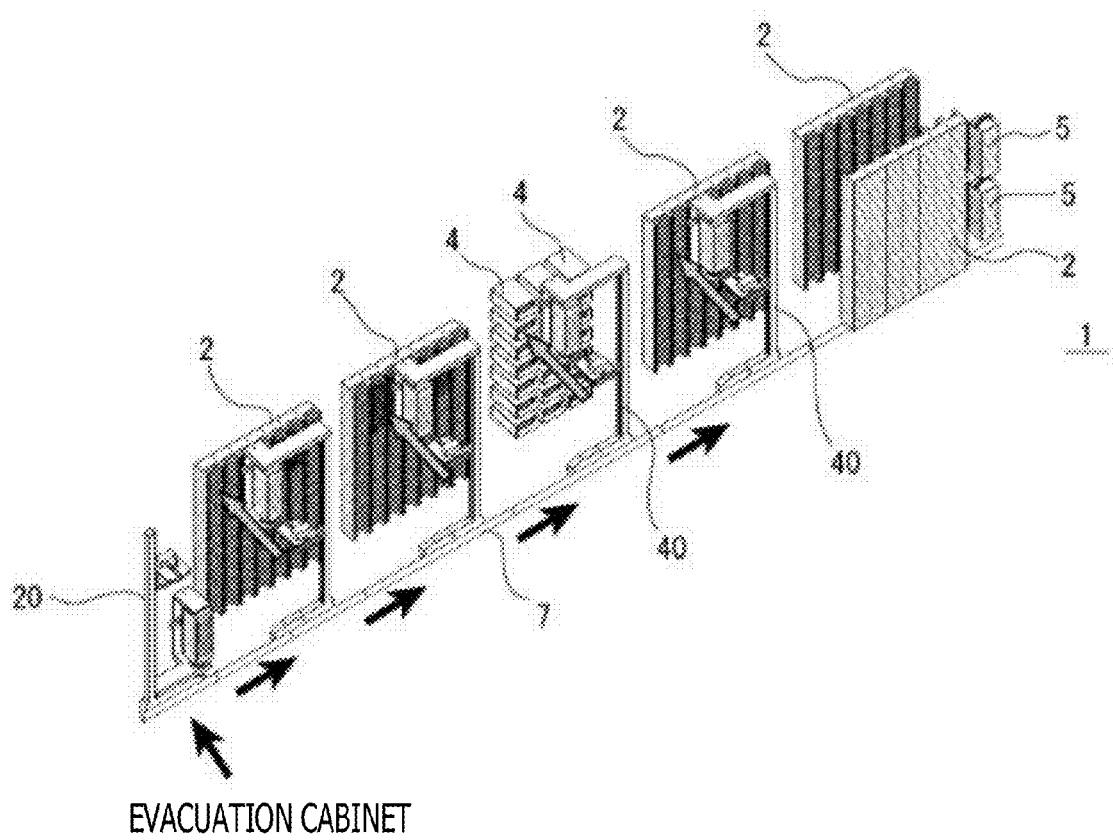
FIG. 19 depicts an example of continuation of an operation of a library device.

FIGS. 17A and 17B depict an example of rotation of a opening of a slot. As depicted in FIG. 17A, the hand device 25 of the second robot 40 is put under the lever member 29 of the first robot 20. For example, the hand device 25 moves downward to a certain position and rotates, and the grasping section of the hand device 25 extends. As depicted in FIG. 17B, the elevating base section 24 of the second robot 40 moves upward. Therefore, the rotating shaft 28 rotates, and the transportation body 26 rotates 180 degrees via the rotation device 37. The openings of the slots 26a of the transportation body 26 of the first robot 20 face the hand device 25 provided in the second robot 40. FIG. 18 depicts an example of movement of a storage medium. As depicted in FIG. 18, the storage medium 14 stored in the transportation body 26 of the broken-down first robot 20 is moved to the transportation body 26 of the second robot 40. FIG. 19 depicts an example of continuation of an operation of a library device. As depicted in FIG. 19, the library device 1 may continue an unfinished job of the first robot 20.

FIGS. 20A to 20C depict an example of a return to original orientation of a transportation body. After the repair of the first robot 20 is completed, as depicted in FIGS. 20A to 20C, the transportation body 26 may be returned to an original state. For example, as depicted in FIG. 20A, the hand device 25 of the first robot 20 is moved above the lever member 29 and is rotated, and the grasping section of the hand device 25 extends. As depicted in FIG. 20B, the elevating base section 24 of the first robot 20 moves downward. As a result, as depicted in FIG. 20C, the openings of the slots 26a of the transportation body 26 of the first robot 20 face the hand device 25 provided in the first robot 20. The library device 1 returns to a normal state in which the first robot 20 and the second robot 40 are allowed to operate.

When the second robot 40 has broken down, the operation of the library device 1 may also be continued by a similar operation.

In the library device, since the first robot and the second robot each have the transportation body 26, a large number of storage media 14 may be collectively transported at one time. This may shorten the time for transporting a large number of storage media 14. Even when one robot has broken down, the other robot operates. Since the storage medium 14 that was being transported by the broken-down robot is moved to the other robot, the operation of the library device 1 may be continued.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A library device comprising:
   a first robot configured to transport a storage medium stored in a storage rack; and
   a second robot configured to transport the storage medium stored in the storage rack; and
   wherein
   the first robot and the second robot each include:
   a hand device;
   a transportation body including a slot to store the storage medium;
   a rotation device configured to rotate the transportation body between a first orientation in which an opening of the slot faces the hand device of at least one of the first robot and the second robot and a second orientation in which the opening of the slot faces the hand device of the other one of the first robot and the second robot; and
   a switch device configured to control the rotation device,
   wherein the hand device of the second robot receives the storage medium which is stored in the transportation body of the first robot from the first robot.

2. The library device according to claim 1, wherein
   the rotation device is installed in a standing manner in a fixing base section of each of the first robot and the second robot.

3. The library device according to claim 1, wherein
   the rotation device includes:
   a rotating shaft including a screw section provided on a surface;
   a lever member configured to rotate the rotating shaft by being screwed on the screw section and performing up-and-down movement in an axial direction of the rotating shaft; and
   a rotation transferring section configured to transfer rotation of the rotating shaft to the transportation body.

4. The library device according to claim 1, wherein
   the switch device includes the hand device that moves up and down.

5. The library device according to claim 1, wherein
   the first robot and the second robot are disposed on the substantially same orbit.

6. The library device according to claim 5, wherein the transportation body of the first robot and the transportation body of the second robot are disposed in such a way that the transportation body of the first robot and the transportation body of the second robot are displaced from each other in a direction orthogonal to the orbit.

7. The library device according to claim 1, further comprising:
an evacuation section configured to evacuate one of the first robot and the second robot to a position that is off a position facing the storage rack.

8. A library device comprising:
a first robot configured to transport a storage medium stored in a storage rack; and
a second robot configured to transport the storage medium stored in the storage rack,
wherein the first robot and the second robot each include:
a hand device;
a transportation body including a slot to store the storage medium;
a rotation device configured to rotate the transportation body between a first orientation in which an opening of the slot faces the hand device of at least one of the first robot and the second robot and a second orientation in which the opening of the slot faces the hand device of the other one of the first robot and the second robot; and
a switch device configured to control the rotation device, wherein the rotation device includes:
a rotating shaft including a screw section provided on a surface;
a lever member configured to rotate the rotating shaft by being screwed on the screw section and performing up-and-down movement in an axial direction of the rotating shaft; and
a rotation transferring section configured to transfer rotation of the rotating shaft to the transportation body.

9. The library device according to claim 8, wherein the switch device includes the hand device that moves up and down.

10. The library device according to claim 8, wherein the first robot and the second robot are disposed on the substantially same orbit.

11. The library device according to claim 10, wherein the transportation body of the first robot and the transportation body of the second robot are disposed in such a way that the transportation body of the first robot and the transportation body of the second robot are displaced from each other in a direction orthogonal to the orbit.

12. The library device according to claim 8, further comprising:
an evacuation section configured to evacuate one of the first robot and the second robot to a position that is off a position facing the storage rack.

13. The library device according to claim 1, wherein the first robot includes a first frame and a first fixing plate coupled to a first end of the first frame, the second robot includes a second frame and a second fixing plate coupled to a second end of the second frame on an opposite side to the first end, the transportation body of the first robot is provided on the first fixing plate, and the transportation body of the second robot is provided on the second fixing plate.

14. The library device according to claim 13, wherein the first frame and the second frame stand on a rail so as to face with each other.

15. The library device according to claim 14, wherein the transportation body of the first robot and the transportation body of the second robot are provide so as to shift with each other in a orthogonal direction to the rail.

16. The library device according to claim 14, wherein the hand device of the first robot moves up and down along the first frame and the hand device of the second robot moves up and down along the second frame.

* * * * *